No. 767,808. PATENTED AUG. 16, 1904.
A. FORBES.
FILTER.
APPLICATION FILED FEB. 1, 1904.
NO MODEL. 2 SHEETS—SHEET 1.

No. 767,808. PATENTED AUG. 16, 1904.
A. FORBES.
FILTER.
APPLICATION FILED FEB. 1, 1904.
NO MODEL. 2 SHEETS—SHEET 2.

Witnesses
Edwin L. Yewell
S. E. Ballinger

Inventor
Andrew Forbes
By Chas E. Riordan
His Attorney

No. 767,808. Patented August 16, 1904.

UNITED STATES PATENT OFFICE.

ANDREW FORBES, OF PHILADELPHIA, PENNSYLVANIA.

FILTER.

SPECIFICATION forming part of Letters Patent No. 767,808, dated August 16, 1904.

Application filed February 1, 1904. Serial No. 191,506. (No model.)

*To all whom it may concern:*

Be it known that I, ANDREW FORBES, a citizen of the United States, residing at Philadelphia, in the county of Philadelphia and State of Pennsylvania, have invented new and useful Improvements in Filters, of which the following is a specification.

My invention relates to filtering apparatus especially designed for the filtration of distilled liquors and wines, but also well adapted for filtering liquids of any character.

The primary object of the invention is to provide a filtering apparatus comprising a plurality of tanks or chambers all communicating with a common supply or feed-receptacle and also with a discharge-pipe, whereby the contents of all of the several tanks or filtering-chambers may be drawn off through a single discharge cock or faucet.

A further object of the invention is to provide a filtering apparatus comprising a central standard, a plurality of independent tanks or filtering-chambers surrounding the standard, means for supporting the tanks in fixed relation to the standard and one another, and pipe connections for supplying liquid to the tanks from a common inlet-receptacle and directing the filtered liquid to a common discharge-conduit.

A further object of the invention is to provide a filtering-tank of novel construction comprising separable sections and convenient and effective means for securing the sections together detachably to permit of the cleansing of the tanks and the renewal of the filtering devices inclosed therein.

The construction of the apparatus will be fully described hereinafter in connection with the accompanying drawings, which form part of this specification, and the novel features of the invention will be particularly pointed out in the appended claims.

Figure 1:
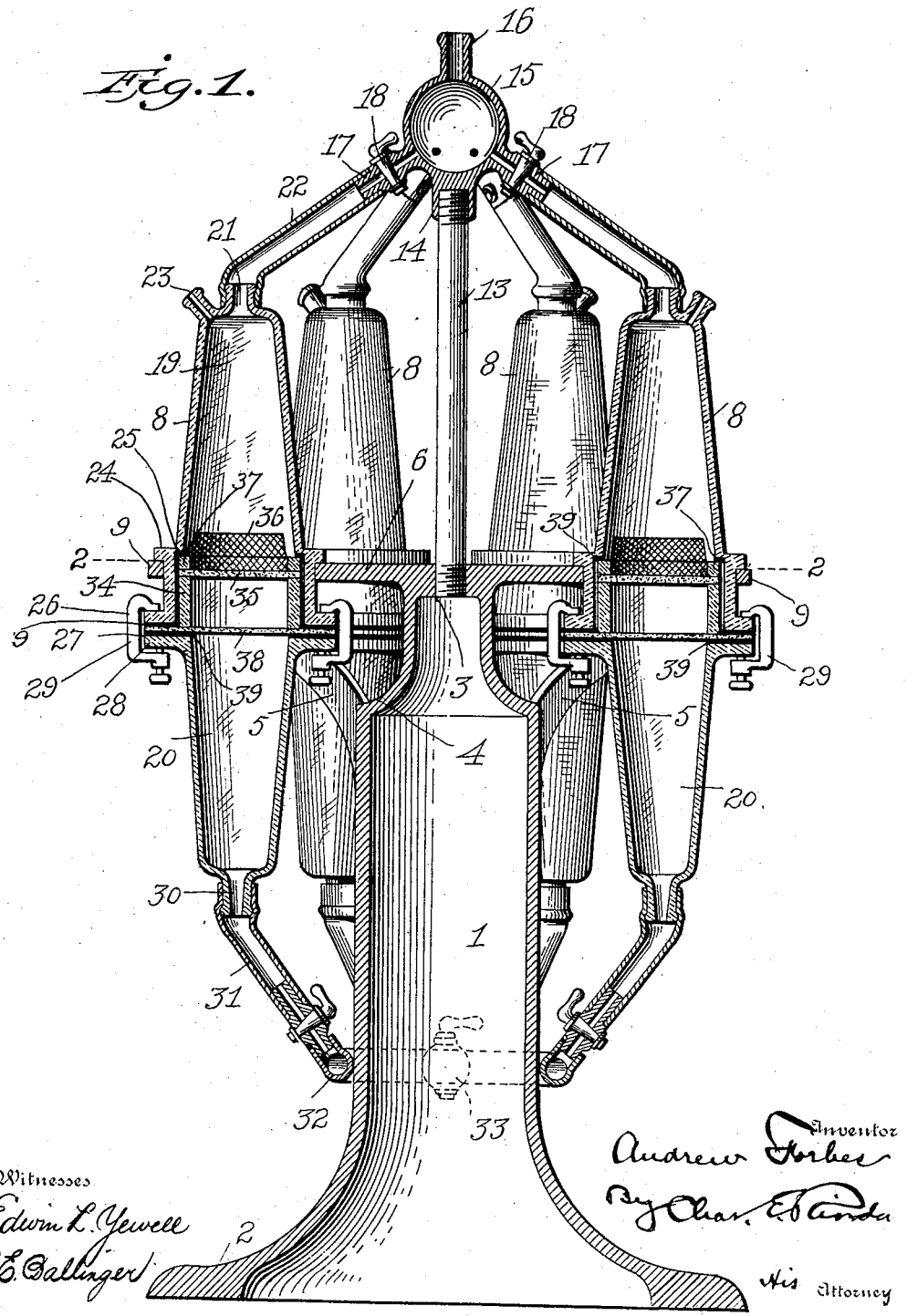
Figure 2:
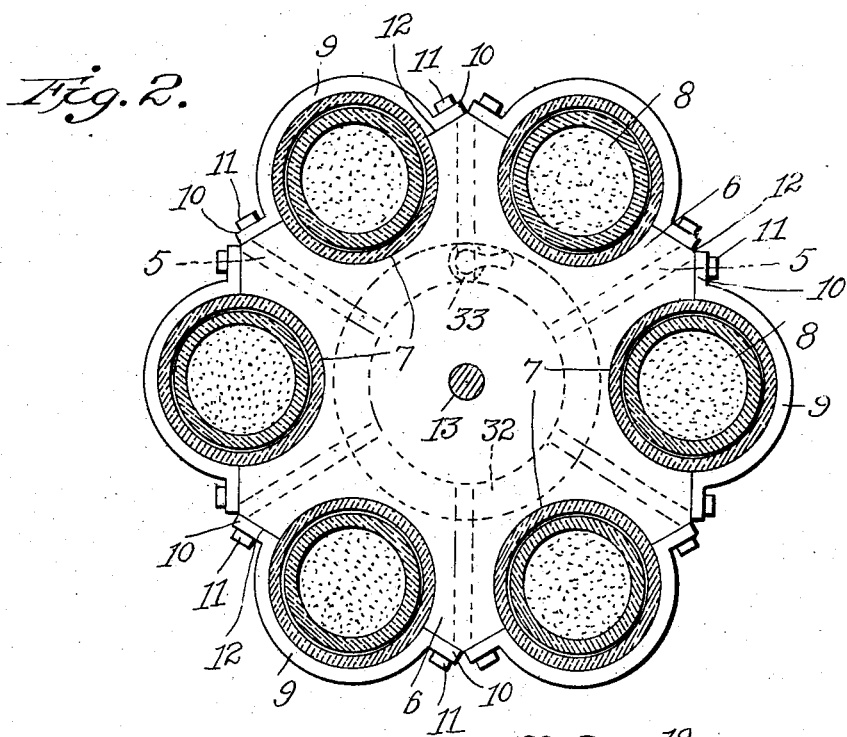
Figure 3:
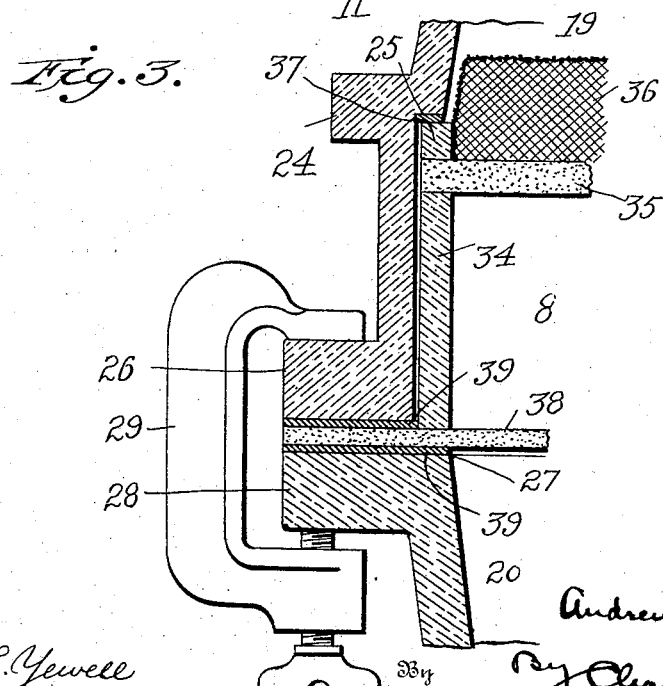

In the drawings, Figure 1 is a sectional elevation of an apparatus embodying the invention. Fig. 2 is a horizontal section of the same on the line 2 2 of Fig. 1; and Fig. 3 is a detail vertical section, on an enlarged scale, of one of the filtering-tanks.

The reference-numeral 1 designates a standard, which is preferably a hollow casting, having a flared base 2 and an internally-threaded opening 3 at its upper end. The upper end of the standard is circumferentially reduced, forming an annular shoulder 4, and below said shoulder at equal distances apart a plurality of radial arms 5 project from the standard, six of said arms being shown in the drawings to correspond to the number of tanks employed.

Supported upon the upper ends of the radial arms 5 is a table 6, formed at its outer edge with a series of semicircular equidistant recesses 7, serving as seats for the filtering-tanks 8, which fit within said recesses and are supported therein by a series of yokes or keepers 9, each comprising a semicircular band having oppositely-projecting end flanges 10, bored to receive screws 11, which enter threaded openings in the adjacent flattened edge portions 12 of the table 6.

13 designates a rod screw-threaded at its ends and secured at its lower end within the opening 3 of the standard and at its upper end within a threaded nipple 14, depending from a supply-receptacle 15, the latter also being provided with an upwardly-projecting nipple 16 for the attachment of a hose or supply-pipe leading from a barrel, cask, or other source of liquid-supply. The supply-receptacle 15 is also provided with a plurality of discharge-nipples 17, projecting downward and outward and each equipped with a valve or cock 18, there being one of such nipples for each filtering-tank. As the filtering-tanks are all of the same construction, a detailed description of one will suffice. Each tank consists of two hollow sections 19 and 20, preferably of glass and of slightly-tapering form. The upper section 19 is formed at its upper end with an inlet-nipple 21, designed to be connected by a suitable detachable pipe 22 with the adjacent projecting nipple 17 of the receptacle 15, and said section is also formed with an air-vent 23 near the nipple 21. Above its lower end the section 19 is provided with an annular flange 24, which rests on the table 6, and said section is formed with an interior annular shoulder 25. From the lower end of the section 19 projects an annular horizontal flange 26. The lower section 20 is of less diameter than the upper section. to provide an annular seat 27, and an annular flange 28 projects from the upper end of the section, said flange extending under the flange 26 of the upper section and being clamped thereto by a plurality of clamps 29. The lower end of the section 20 is provided with a nipple 30, designed to be connected by a suitable detachable pipe 31 with a circular discharge-pipe 32, encircling the standard 1 and having an outlet-cock 33.

Within the upper section 19 of the tank is a ring or collar 34, resting on the diaphragm 38, and upon said collar is supported a disk 35, of flannel or other suitable filtering fabric, above which is fitted a cup-shaped filtering-screen 36, of wire mesh. A ring 37 surrounds the screen 36, said ring fitting under the shoulder 25 of the upper section of the tank and resting upon the disk 35.

From the foregoing it will be seen that the filter may be varied as to capacity, one or more of the filter units or tanks may be cut out or brought into operation by means of the valves of the nipples 17 and 30 of the supply and discharge, and that said units or tanks may be bodily removed when so cut out for cleansing by simply detaching the pipes or tubes connecting them with the common supply 15 and discharge 32. In case one or more filter units need cleaning and the full capacity of the device is required the clogged units may be removed and immediately replaced by extra units, thus insuring the full capacity of work at all times.

For convenience of manipulation and economy of construction I prefer short sections of rubber tubing to connect the nipples of the tanks or units with the nipples of the supply and discharge, as is illustrated in Fig. 1, but do not confine myself to this specific construction.

I would have it understood that I reserve the right to make all such modifications or variations in the details of construction as may fall with the terms and scope of the following claims.

Having thus fully described my invention, what I claim as new, and desire to secure by Letters Patent of the United States, is—

1. A filtering apparatus comprising a standard having a series of diverging arms and a table supported thereon having peripheral recesses, a plurality of filtering-tanks seated one within each recess and bodily removable therefrom, clamps for securing the tanks to the table, a supply-receptacle and discharge carried by the standard, and closable detachable pipe connections between the several tanks and said supply and discharge.

2. A filter-tank consisting of two separable sections having annular flanges at their meeting ends, a filter-screen and filter fabric located in the lower end of the upper section at a distance apart, a filtering-diaphragm seated between the flanges of the sections, spacing rings, and clamps embracing the flanges of the sections, substantially as described.

3. A filtering apparatus comprising a standard having a table provided with a plurality of edge recesses and a supply-receptacle above the table, a plurality of bodily-removable filter-tanks supported in said recesses, yokes embracing the tanks and detachably secured to the table, detachable closable pipe connections between the supply-receptacle and the several tanks, a discharge-pipe encircling the standard below the tanks, and detachable closable pipe connections between the discharge and the lower ends of the tanks, substantially as described.

In testimony whereof I have signed my name to this specification in the presence of two subscribing witnesses.

ANDREW FORBES.

Witnesses:
HARRY P. KATZ,
BENJ. WINTERFOSS.